April 26, 1927.
F. HODGKINSON
TURBINE GLAND
Filed July 2, 1921
1,626,237
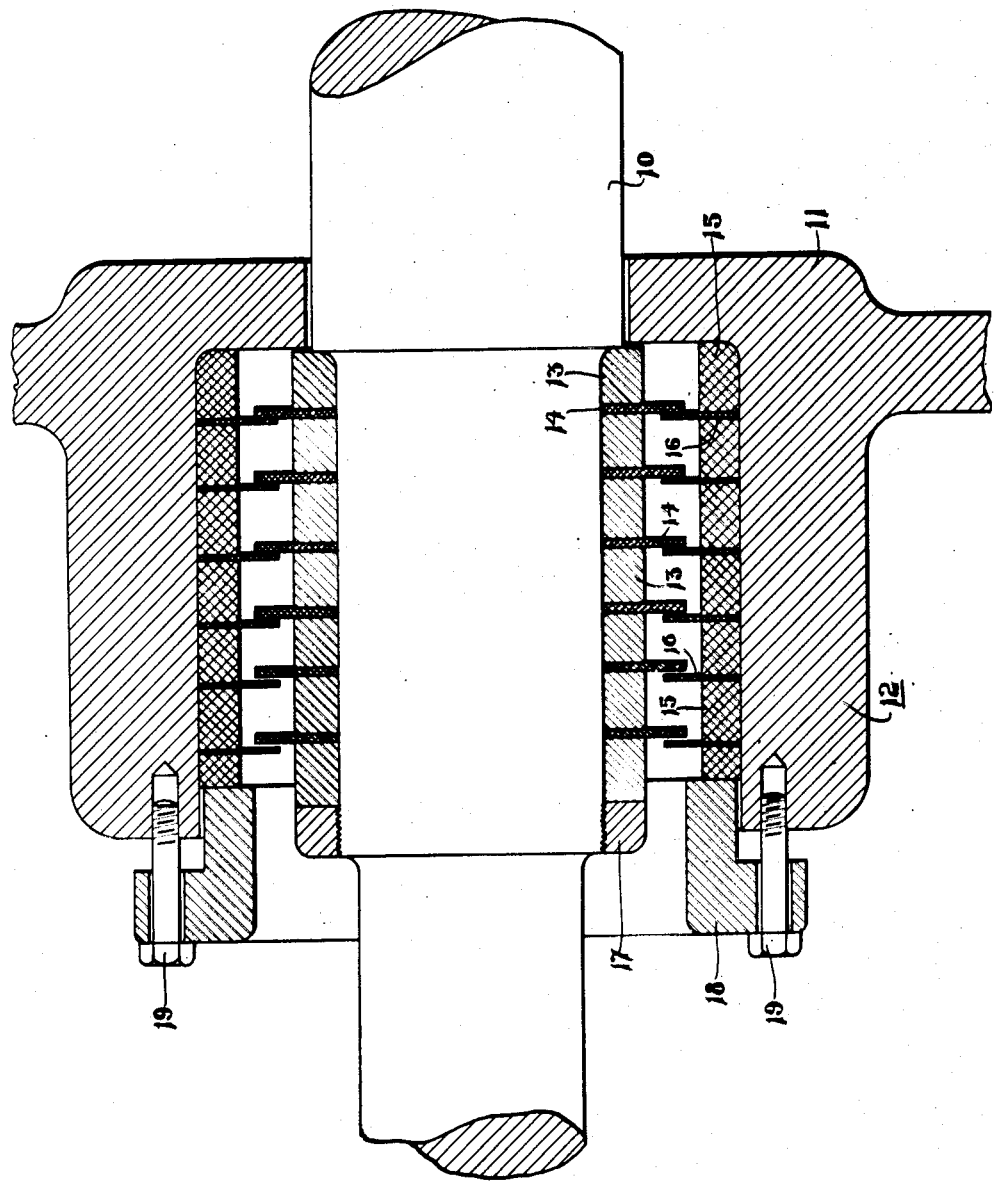
Francis Hodgkinson
INVENTOR
BY D. C. Davis.
ATTORNEY Patented Apr. 26, 1927.

1,626,237

UNITED STATES PATENT OFFICE.

FRANCIS HODGKINSON, OF SWARTHMORE, PENNSYLVANIA, ASSIGNOR TO WESTINGHOUSE ELECTRIC & MANUFACTURING COMPANY, A CORPORATION OF PENNSYLVANIA.

TURBINE GLAND.

Application filed July 2, 1921. Serial No. 482,284.

My invention relates to shaft packings and more particularly to labyrinth packings for fluid pressure devices, and it has for its object to provide apparatus of the character designated which shall be simple in operation, rugged in construction, and in which the stationary packing elements may be accurately centered with respect to the axis of rotation, prior to rigidly securing the shaft packing elements in the shaft casing for a desired progressive clearance adjustment throughout the several packing elements.

Other objects will be more manifest in the description given in the following specification, in which the single drawing is a diagrammatic view, partially in section, of an apparatus constructed in accordance with my invention.

In the successful operation of fluid pressure devices as, for example, steam turbines, a fluid leakage between the turbine casing and its shaft is most effectively prevented by the employment of labyrinth packing glands embodying constructions well known in this art.

To overcome certain difficulties heretofore experienced in labyrinth packing installations, I provide two series of specially constructed packing elements, one series being movable with respect to the other and the arrangement being such that the spacing members between the packing elements of the stationary series are progressively greater in width than the spacing elements between the packing elements of the movable series. The packing elements carried by the casing interleave and cooperate with the respective packing elements carried by the shaft, the distances intervening between each casing element and its cooperating shaft element increasing progressively, preferably in the direction of steam flow. The packing elements and spacing members form pressure reduction chambers which maintain a pressure reduction in proportion to the amount of clearance between the packing elements.

Referring to the drawings for a more detailed description of an apparatus constructed in accordance with my invention, I indicate at 10 a shaft projecting through a fluid-pressure machine casing 11 which has integrally formed therewith a gland 12. Packing of the labyrinth type is effected by placing over the shaft 10 metallic spacing rings 13 alternating with heavy metallic discs 14 of a greater outside diameter. The discs 14 preferably are made of antimonial lead. Spacing rings 15 of compressible metallic composition are fitted within the stationary portion of the gland structure alternating with a relatively thin metallic disc 16 of high resiliency and smaller inside diameter than the spacing rings 15. I preferably make these discs of hard bronze. The arrangement of the elements is such that the metallic discs 14 carried by the movable shaft and the discs 16 carried by the stationary gland casing present a variable clearance contact on assembly. The desired number of packing elements are assembled on the shaft and held in a rigid, evenly spaced position by a nut element 17. The packing elements 16 carried by the gland casing are spaced by the relatively soft compressible members 15 which vary progressively in width outwardly from the inside of the gland, said packing being held by a gland cap 18 having a suitable adjustable screw follow-up device, as for example, lag bolts 19.

The interleaving packing elements are thus spaced in pairs, the distances intervening between the elements comprising each pair increasing progressively in the direction of steam flow. The throttling effect created by the respective pairs of packing elements is substantially constant, however, inasmuch as the pressure of the steam is progressively reduced in its successive passage through the chambers intervening between the pairs of elements. The workmanship involved in the construction of a gland of this character is not so exacting as that required in the usual form of gland in which the restricted clearances provided between the packing elements must be exactly equal. Furthermore, the members comprising the initial pair of packing elements, that is, the pair disposed adjacent to the turbine casing, may be spaced in closer relation than is advisable with glands in which the packing elements of each pair are separated by the same distance as the initial pair.

Having thus described an apparatus constructed in accordance with my invention, the adjustment thereof is carried out in the following manner: The packing elements are loosely assembled, the first spacing element 13 being first mounted on the shaft and adjacent thereto is placed the relatively heavy metallic disc 14. A special spacing element 15 is placed within the gland casing and adjacent thereto is placed the resilient packing disc 16, the arrangement being such that the metallic discs 13 and 16 run in relatively close clearance contact. The series of packing elements is applied, as shown, and the elements in the gland are held by the adjustable gland cap 18. The shaft is then rotated at normal speed and a light adjustment is effected by the gland cap 18. The shaft is then stopped and the elements thereon are tightened. The shaft is then again rotated and the gland cap is then tightened to bring into contact a sufficient number of discs to prevent fluid leakage. Owing to the fact that the distances intervening between the packing elements comprising the respective pairs increase progressively, the packing elements of the housing and the shaft are forced into contact successively and not simultaneously, whereby only a sufficient number of packing elements may be forced into contact as is required for effective sealing. In assembling and tightening the packing elements while the shaft is in rotation, a correct alinement and perfect adjustment of the packing elements is attained without imposing upon the elements undue strain usually caused by tightening when no relative movement is given the packing elements. If, for any cause, objectionable leakage should occur, the clearance contact between the two sets of discs may be made closer by tightening down the gland cap 18, this action causes the soft metallic spacing elements separating the thin metallic discs within the gland to compress, thereby bringing the hard resilient discs in closer contact with the relatively soft heavy discs carried by the rotor shaft and thereby effectively preventing any objectionable leakage.

In connection with the invention herein disclosed, I call attention to the co-pending application of Warren B. Flanders; Serial No. 482,207, filed July 2, 1921, and assigned to the Westinghouse Electric & Mfg. Company, which discloses and claims a labyrinth packing in which the disc elements carried by the shaft and the gland casing are spaced by relatively soft members, the edges of the discs contacting with the respective members to form a fluid seal.

While I have shown my invention in but one form, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. A labyrinth packing comprising a rotatable shaft, a series of annular packing discs carried by the shaft, a casing member, a series of annular packing discs carried by the casing member and interleaving with the packing discs carried by the shaft, the distances intervening between the nearest adjacent interleaving packing discs increasing progressively in the direction of steam flow, and means for varying the distances intervening between the nearest adjacent interleaving packing discs.

2. In a gland packing, the combination of a rotatable shaft, a series of packing elements carried by the shaft, a housing, a series of packing elements carried by the housing and cooperating respectively with the elements carried by the shaft, the distance intervening between each packing element of the shaft and its cooperating interleaving element of the casing increasing progressively in the direction of steam flow, and means to progressively vary the distances intervening between each element of the shaft and its cooperating element of the casing.

In testimony whereof, I have hereunto subscribed my name this 30th day of June, 1921.

FRANCIS HODGKINSON.